Sept. 25, 1962
A. M. WARN ET AL
3,055,471
ROLLER CLUTCH MEANS
Filed Sept. 30, 1960
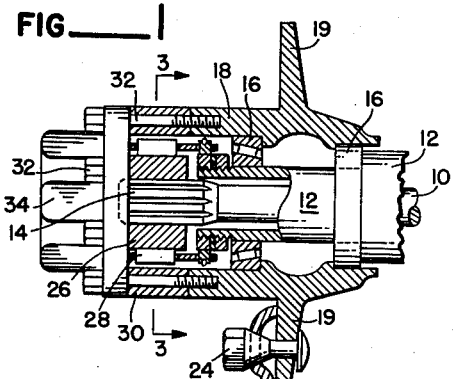
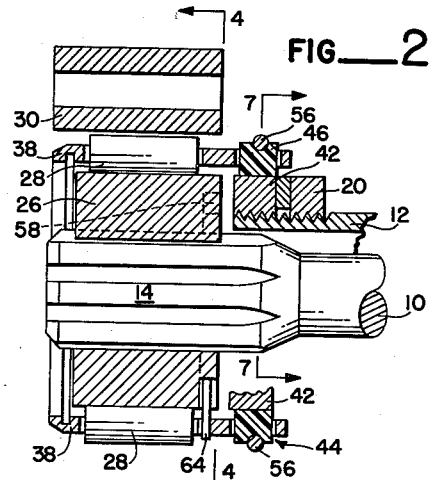
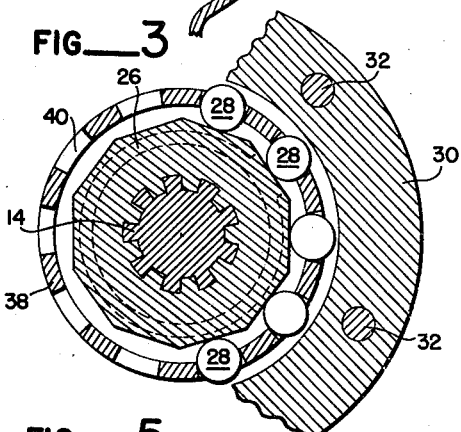
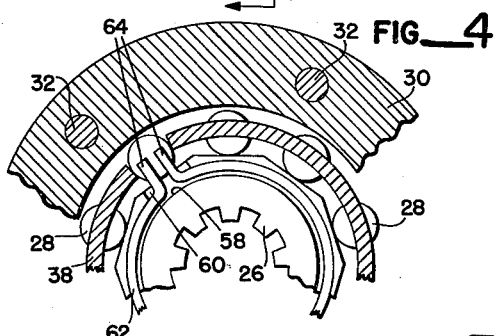
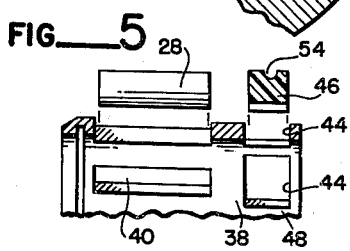
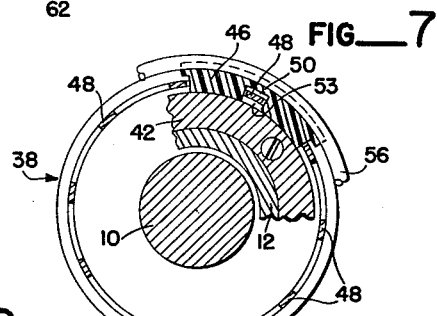
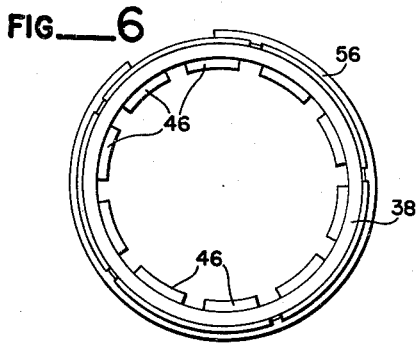
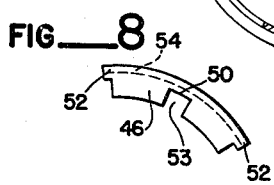
ARTHUR M. WARN
HARRY J. HEGAR INVENTORS
BY

United States Patent Office 3,055,471
Patented Sept. 25, 1962

3,055,471
ROLLER CLUTCH MEANS
Arthur M. Warn, Seattle, Wash., and Harry J. Hegar, Portland, Oreg., assignor to Warn Manufacturing Company, Seattle, Wash., a corporation of Washington
Filed Sept. 30, 1960, Ser. No. 59,549
7 Claims. (Cl. 192—45)

This invention relates to a roller clutch means and, more particularly, is concerned with new and useful means for momentarily securing the roller cage of a roller clutch against rotation with a shaft upon the application of torque to the shaft.

The main objects of this invention are to provide roller cage arresting or securing means for roller-type clutches, which means is simple to construct and assemble, is practically indestructible, requires little or no attention during long periods of operation, and which may be inexpensively manufactured, installed and used. These and other objects of the invention will be more apparent from the following disclosure of the details of a preferred structure embodying the new and useful means comprising the invention here.

In the accompanying drawings,

FIG. 1 is a vertical, sectional view of a motor vehicle wheel hub incorporating my invention;

FIG. 2 is an enlarged sectional view of a portion of the roller clutch means of this invention;

FIG. 3 is a cross-sectional view, taken on line 3—3 of FIG. 1, portions having been broken away and omitted for convenience of illustration;

FIG. 4 is a fragmentary cross-section, taken on line 4—4 of FIG. 2;

FIG. 5 is a fragmentary, detailed end view of a portion of the roller clutch, a roller and an arresting shoe;

FIG. 6 is an end view of the roller cage;

FIG. 7 is a fragmentary, sectional view, taken on line 7—7 of FIG. 2; and

FIG. 8 is a face view of clutch shoe.

Referring to FIG. 1, axle shaft 10 passes through the non-rotatable spindle sleeve 12 and has splined end 14. By means of bearings 16—16, the wheel hub 18 is mounted for rotation about spindle 12. Wheel hub 18 is secured to the spindle by nut 20 which bears against the outboard bearing 16 as shown in FIG. 1. Wheel hub 18 has an outstanding wheel flange 19. A wheel 22 is secured to the flange 19 by conventional bolts 24. The wheel 22 and its hub 18 are normally free rolling and rotate about the axis and shaft 10. However the wheel may be driven when torque is applied to shaft 10 through the functioning of a roller clutch means to be described.

Polygonal sleeve 26 is interiorly splined to slide onto and be secured thereby to the splined end 14 of shaft 10. Rollers 28 are disposed on the flat surfaces of the polygonal sleeve 26 and lie between such flat surfaces and the inner cylindrical surface of race 30. Slight rotation of sleeve 26 relative the race 30 applies a camming action to the rollers 28 causing them to engage and bind on the inner surface of race 30. Race 30 is secured to the hub 18 in outward extension thereof by means of bolts 32. Hub cap 34, also secured by the bolts 32, covers the end of the shaft and the clutch mechanism.

The rollers 28 are arranged in openings in cage 38, each roller being disposed in a port 40 of suitable size to receive the cylindrical roller 28. The cage 38 encircles the polygonal sleeve 26 and extends in overlapping relation to the outboard end of spindle sleeve 12, which threadedly receives and supports annular ring nut 42 which provides an exterior cylindrical braking surface. That portion of cage 38 overlying ring 42 has a plurality of ports 44 in each of which is mounted a friction shoe 46. Preferably the friction shoes 46 are formed by molding techniques.

It is desirable that the shoes 46 be formed of a non-metallic material such as a molding resin which is chemically inert, has resiliency and toughness is thermally stable, and has high mechanical strength. Preferable synthetic resins include tetrafluoroethylene resin of which the Du Pont product "Teflon" is a good example, and the nylon synthetic resin derived from polymeric amides of which Du Pont product "Zytel" is an example. Both products permit deformation under loading and readily conform to the braking surface in the application described herein. It will be obvious that other synthetic resin materials may be adapted for use in this clutch mechanism. References above to specific materials are by way of example and not by way of limitation.

Between each pair of ports 44 there is a web member 48 as an integral part of the cage 38. As shown in FIG. 8, the shoes 46 are preferably formed in pairs connected by a bridging element 50 which spans the web portion 48 between pairs of ports 44. Ears 52 are also provided on the ends of the shoes to partially overlap the webs 48. The exterior surface of the shoe has groove 54, as may be seen in FIGS. 5 and 8, to receive and retain annular spring 56 which encircles the shoes and the roller cage outward of ports 44. Spring 56 biases the shoes inward into bearing contact with the cylindrical braking surface of ring 42. Spring 56 is located in groove 54 and is annular in shape. Normally the ring spring is snapped in place during the assembly operation. It will, of course, be apparent that other forms of biasing means may be equally satisfactorily employed to urge the shoes 46 into friction engagement with the cylindrical surface of ring 42.

The inner end face of polygonal sleeve 26 is provided with a groove 58 that is notched at 60. Expansion spring 62 is mounted in groove 60 and its ends are formed as a pair of outstanding horns 64—64 which extend through the notch 60 and engage in an end of one of the slots 40 of cage 38 near an end of the roller 28 therein. This arrangement involving spring 62 and its horns 64—64 as mounted in sleeve 26 constitutes a flexible, slightly resilient connection between the sleeve 26 and the cage 38. Its function is to center the slots 40 of cage 38 relative the flat surfaces of the polygonal sleeve 26 during periods of non-engagement of the clutching means. The size of rollers 28 is such that when they are located medially of the flat surfaces of the polygonal sleeve 26, they are out of frictional engagement with the inner surface of race 30. It will be understood that slight rotative movement of sleeve 26 relative the inner surface of race 30 will cause the flat surfaces of the polygonal sleeve to rise on one side or the other of the rollers 28 and force the same into frictional engagement with the race, whereupon the clutching action is effected. The clutching action takes place upon the application of torque to the shaft 10 in either direction which causes the relative rotation of the polygonal sleeve 26.

Bearing in mind that the embodiment of this invention is illustrated in connection with a front-wheel-drive apparatus of a four-wheel-drive vehicle, it will be understood that it is desirable that the clutching action occur only when the front-wheel-drive of a vehicle is to be actuated as by the engagement of drive gears between the power unit of the vehicle and the front axle. The clutching action is automatic and terminates automatically when torque is no longer applied to the wheel shaft.

It has been found that it is desirable to momentarily arrest the roller cage when the wheel or hub clutch is to be engaged. This arresting action is accomplished through the functioning of the friction shoes 46 in their frictional engagement on the outer surface of the non-rotatable ring 42. It is normal in such an assembly as shown here for all parts to be lubricated. This means that the shoes 46 as well as the surface of ring 42 with which they are in contact will normally be covered with a film of lubricant. During such time as the wheel 22 is free rolling and the clutch means in the hub is disengaged, or, to put it another way, the shaft 10 and the polygonal sleeve are not rotated due to the fact that power is not being supplied thereto, the rollers 28, the cage 38 and the brake shoes 46, are non-rotatable. When torque is applied to the shaft 10 and the sleeve 26 rotates with the shaft there is a tendency for the rollers 28 and cage 38 likewise to rotate and to roll within the race. However, a light seizure of the shoes 46 under the compression of spring 56 takes place between the shoes and the outer cylindrical surface of ring 42 and, momentarily, the shoes restrain rotation of race 38. Thereupon, because of the movement of the flat surfaces of polygonal sleeve 26, the rollers are squeezed against the inner surface of race 30 and the clutching action takes place. When the hub clutch is disengaged, as when torque is no longer applied to shaft 10, the parts forming the clutch come to rest and spring 56 again presses the shoes 46 against the cylindrical surface. It is a phenomena of the nylon shoes 46 that during periods of non-rotation and when they are at rest on the cylindrical surface, sufficient frictional engagement takes place to effect the seizure mentioned above. Of course, at such times the rollers 28 are recentered on the polygonal surfaces due to functioning of spring 62.

The depth of the groove 53 between pairs of shoes 46 is such that normally the bridge 50 does not bear on the web portion 48 of the cage 38 between the ports 44. This spacing accommodates wear which may take place on the friction surfaces of the shoes 46.

It will be apparent to those skilled in the art that the invention herein may be applied, otherwise than as shown here, between a drive shaft and a member to be driven thereby. For example, the invention may be applied to the hub of a drive pulley or flywheel in many kinds of mechanism without material alteration of its arrangement of parts or principles of operation. It will also be apparent to those skilled in the art that changes and modifications may be made in the structure embodying this invention without departing from the spirit of the invention as defined in the subjoined claims. All such changes and modifications which are the fair equivalents of the claimed structure are deemed a part of the patentable invention herein.

Having thus described our invention, we claim:

1. In a roller clutch disposed between a shaft and a surrounding race and including a roller cage, means for momentarily securing the roller cage against rotation when torque is applied to the shaft, said means comprising: a non-rotatable element providing a cylindrical friction surface about said shaft adjacent said clutch; said cage being extended to enclose the cylindrical surface in spaced apart relation; a series of ports located in said cage extension around said cylindrical surface; a friction shoe mounted in each port to bear on the cylindrical surface, said shoes being joined in pairs by a bridge spanning between the ports in which such paired shoes are located; and means biasing said pairs of shoes into frictional contact with said cylindrical surface.

2. The structure according to claim 1 in which the biasing means comprises an annular spring encircling said shoes and said cage outward of said ports.

3. In a roller clutch disposed between a shaft and a surrounding race and including a roller cage, means for momentarily securing the roller cage against rotation when torque is applied to the shaft, said means comprising: a non-rotatable element providing a cylindrical friction surface about said shaft adjacent said clutch; said cage being extended to enclose the cylindrical surface in spaced apart relation, said cage extension having a series of ports; a friction shoe radially movable in each port; and means biasing said shoes into frictional contact with said cylindrical surface.

4. The structure according to claim 3 in which the biasing means comprises a resilient ring element encircling the outer surfaces of said shoes.

5. In a roller clutch disposed between a shaft and a surrounding race and including a roller cage, means for momentarily securing the roller cage against rotation when torque is applied to the shaft, said means comprising: a non-rotatable element providing a cylindrical friction surface about said shaft adjacent said clutch; said cage being extended to enclose the cylindrical surface in spaced apart relation; a series of friction shoes mounted in said cage extension; and means biasing said shoes into frictional contact with said cylindrical surface.

6. The structure according to claim 5 in which said friction shoes are formed of a material selected from the group consisting of polymeric amides resin and tetra fluorethylene resin.

7. In a roller clutch disposed between a shaft and a surrounding race and including a roller cage, a non-rotatable element providing a cylindrical friction surface about said shaft adjacent said clutch; said cage enclosing said cylindrical surface in spaced apart relation; an annular series of synthetic resin friction shoes radially movable in said cage means; and means biasing said shoes into frictional contact with said cylindrical surface.

References Cited in the file of this patent

UNITED STATES PATENTS 2,699,230    Pfalzgraff et al. _____ Jan. 11, 1955

FOREIGN PATENTS 435,561    Germany _____ Oct. 14, 1926